United States Patent [19]
Franks et al.

[11] Patent Number: 5,525,193
[45] Date of Patent: Jun. 11, 1996

[54] USE OF MONOCOMPONENT CELLULASE FOR REMOVING INKS, COATINGS, AND TONERS FROM PRINTED PAPER

[75] Inventors: Neal E. Franks, Newtown; Steven E. Bazewicz, Wilton, both of Conn.; Hans C. Holm, Gentofte, Denmark

[73] Assignee: Novo Nordisk A/S, Bagsvaerd, Denmark

[21] Appl. No.: 329,571

[22] Filed: Oct. 26, 1994

[51] Int. Cl.⁶ .................................. D21G 5/02
[52] U.S. Cl. .................. 162/5; 162/7; 162/8; 162/72; 435/278
[58] Field of Search .............. 162/5, 7, 8, 5 B, 162/4, 76, 72, 72 B; 435/277, 278

[56] References Cited

U.S. PATENT DOCUMENTS

| | | | |
|---|---|---|---|
| 4,343,679 | 8/1982 | De Ceuster et al. | 162/4 |
| 5,110,412 | 5/1992 | Fuentes et al. | 162/5 |
| 5,275,944 | 1/1994 | Himmel et al. | 435/209 |
| 5,308,449 | 5/1994 | Fuentes et al. | 162/72 |
| 5,364,501 | 11/1994 | Baret et al. | 162/5 |

FOREIGN PATENT DOCUMENTS

| | | | |
|---|---|---|---|
| 758488 | 5/1967 | Canada. | |
| 59-9299 | 7/1982 | Japan. | |
| 2-80683 | 4/1984 | Japan | D21C 5/02 |
| 63-59494 | 3/1988 | Japan. | |
| WO91/14819 | 10/1991 | WIPO. | |

OTHER PUBLICATIONS

Jeffries et al., TAPPI Journal, vol. 77, No. 4, pp. 173–179, 1993.
Kim et al., TAPPI Pulping Conference, pp. 1023–1030, 1991.
D. Y. Prasad, Appita vol. 46, No. 4, pp. 290–292, 1993.
Prasad et al., Enzymatic Deinking of Colored Offset Newprint, pp. 284–286, 1992.

Primary Examiner—David L. Lacey
Assistant Examiner—Jose A. Fortuna
Attorney, Agent, or Firm—Steve T. Zelson; Cheryl H. Agris

[57] ABSTRACT

The invention is directed to a method for deinking and uncoating printed paper which comprises using a monocomponent cellulase during recycling.

25 Claims, 5 Drawing Sheets

USE OF MONOCOMPONENT CELLULASE FOR REMOVING INKS, COATINGS, AND TONERS FROM PRINTED PAPER

1. FIELD OF THE INVENTION

The invention is directed to a method for removing inks, coatings, and toners during the recycling of printed paper using a monocomponent cellulase.

2. BACKGROUND OF THE INVENTION

The impetus to recycle increasing amounts of various printed paper streams has become a worldwide event. This is especially evident in areas, like North America, where this approach has not been widely practiced. For some grades, such as old corrugated cardboard, the rate of recycling in the U.S. is now greater than 50%.

Some of the higher quality grades, including mixed office waste have not shown the same rate of reuse and therefore present a severe disposal problem. This is due to the difficulty of removing polymeric inks, coatings, and toners such as non-contact, fused laser printer inks, xerographic toners, UV/EB cured inks, varnish overlays, and coated papers. Chemical deinking agents, e.g., sodium hydroxide, sodium silicate, and hydrogen peroxide, may not work well for laser ink and xerographic toner removal. Specifically, there may be solubilization of the calcium filler at higher pH values. Mechanical dispersion of coatings, non-contact toners, and inks involves both high capital and operating cost. Additionally, irreversible changes in pulp fiber chemistry can occur where a significant proportion of mechanical pulp fiber is included in the furnish.

Enzymes have been used in the prior art to improve the deinking process in xerographic paper, laser printed paper, old magazines, and old newsprint. See, for example, PCT WO 91/14819 (old magazines and newsprint-basic pH); Jeffries et al., 1994, Tappi Journal 77:173–179 (xerographic and laser-printed paper); Kim et al., Proceedings of the 1991 Tappi Conference, pp. 1023–1030 (old newsprint-acidic pH); Prasad et al., 1993, Appita 46:289–292 (xerographic and laser-printed paper); and Prasad et al., 1993, Nordic Pulp and Paper Journal 2:284–286 (old newsprint).

However, each of the above-cited references used only multicomponent cellulases, which contain various types of enzyme activities. No other alternative has ever been considered. The use of multicomponent cellulases poses a number of disadvantages. First, these multicomponent cellulases contain a wide variety of enzymatic activities, many of which are unnecessary for deinking. These unnecessary enzymes may cause unwanted degradation reactions and potentially cause yield loss and reduce the fiber strength of the pulp. Second, batch to batch variations will often occur when fusing native multicomponent enzymes where standardization must be based on a joint characteristics. Third, since multicomponent cellulases may only be isolated from microorganisms, it is rather costly to isolate these cellulases; recombinant DNA methods are not applicable.

Therefore, a need exists for an improved deinking process for printing and writing grade printed papers containing for example, laser inks and xerographic toners and for newsprint. It is therefore an object of the invention to provide a method for economically recycling high quality printed papers and newsprint.

3. SUMMARY OF THE INVENTION

The inventors have surprisingly found that in contrast to the prior art enzymes, which are multicomponent enzymes, a monocomponent cellulase can be used in removing inks, coatings, and toners from printed printed papers. Therefore, contra to the teachings of the prior art, it is not necessary to use multicomponent cellulases in the deinking process.

Monocomponent cellulases have a number of advantages over the multicomponent cellulases disclosed in the prior art. The opportunity to tailor exact mixtures of monocomponent cellulases to achieve the desired end result is an advantage not possible with multicomponent cellulases. Monocomponent cellulases are more easily isolated than multicomponent cellulases since they can be obtained using a variety of methods, such as expression of a recombinant DNA sequence encoding the cellulase or by isolation from a given microorganism. It is easier to assay the monocomponent cellulase for its enzymatic activity, since fewer types of enzymatic activity need to be assayed. Furthermore, monocomponent cellulases are generally compatible with surface active agents that may be used in the method of the present invention.

The method of the invention comprises the steps of: (a) pulping said printed paper at a consistency above about 3%; (b) treating the printed paper with at least one monocomponent cellulase in an amount effective to release inks, coatings, and toners from said pulp slurry; and (c) separating the released inks, coatings, and toners from the pulp slurry.

The inks, coatings, and toners removed using the method of the present invention include but are not limited to non-contact laser inks, letterpress ink generally used in printing newsprint, magazine print, offset printing ink, ultraviolet or electron beam cured inks, coatings, and toners, e.g., xerographic toners.

In one embodiment of the invention, the printed paper is roughly pulped, specifically, pulped for about two minutes to about ten minutes. Enzyme is subsequently added and pulping is continued throughout the duration of the enzyme treatment. Alternatively, further pulping may continue after enzyme treatment. The pulp slurry may be diluted upon completion of pulping.

In another embodiment, the printed paper is pulped for at least about 20 minutes. Enzyme is subsequently added and the pulp slurry is treated with the enzyme; no further pulping occurs. The pulp slurry may optionally be diluted either before and/or after enzyme treatment.

In yet another embodiment of the invention, the enzyme may be added to printed paper suspended in water; the printed paper is simultaneously pulped and treated with cellulase to obtain a treated pulp slurry; and the released inks, coatings, and toners are separated from the pulp slurry.

In the method of the invention, only one enzyme, a monocomponent cellulase may be added to the pulp slurry. In another embodiment, at least two monocomponent cellulases are added to the pulp slurry either sequentially or together. In yet another embodiment, a multicomponent cellulase and a monocomponent cellulase may be added to the pulp slurry either sequentially or simultaneously.

5. DETAILED DESCRIPTION OF THE INVENTION

The method of the present invention comprises the following steps: (a) pulping; (b) enzyme treatment; and (c) removal of inks, coatings, and toners from the pulp slurry. The method of the present invention may optionally comprise acidification of the pulp slurry and/or dilution of the pulp slurry. Each of these steps are detailed below.

5.1. Pulping

A conventional high-consistency pulper, used in the paper industry, can be used in the practice of the invention. The pulp consistency should be at least about 3% and is preferably between about 3.5% and about 40%, and most preferably at about 10 to about 20%.

In one embodiment, the printed paper may be roughly pulped for about 2 minutes to 10 minutes. Roughly pulped paper still contains fiber bundles visible to the naked eye, whereas completely pulped paper would have no visible fiber bundles. Enzyme is subsequently added and pulping is continued throughout enzyme treatment. Alternatively, the printed paper may be completely pulped prior to enzyme treatment, specifically from about 20 minutes to about 120 minutes. The pH can range between about 6.5 and about 10 and most preferably between about 7.0 and about 8.5. The temperature may range from about 35° C. to about 75° C. In yet another embodiment, enzyme may be added directly to the waste paper and the pulping and enzyme treatment may occur simultaneously for about 20 to about 120 minutes at about 35° C. to about 75° C.

A surfactant may also be added during the pulping/enzyme treatment step, or after this step, but before a flotation step. The surfactant is preferably nonionic in nature as exemplified by an ethoxylated nonyl or octyl phenol commercially available. A wide variety of nonionic surfactants should work in this application as disclosed by, for example, Park et al., 1992, Biotechnology and Bioengineering 39:117–120.

5.2. Dilution

After pulping is completed, the pulp slurry may be diluted at least about 2 fold, with water or recycled process water. The final consistency may range from about 0.5% to about 3.5%. If pulping is completed before enzyme treatment, the pulp slurry is diluted after pulp and/or after enzyme treatment described below.

5.3. Acidification

If the pH of the pulp slurry is above about 8.5, the pulp slurry should be acidified. The pulp slurry is acidified before enzymatic treatment. The pH after acidification is preferably between about 6.5–8.5.

The acidifying agent in the method of the present invention can be a mineral acid such as sulphuric acid (added in the form of diluted acid). Also, a salt of a strong acid or weak base can be used, e.g., aluminum sulphate, the properties of which make it useful in the paper industry.

An organic acid (such as gluconic or citric) can also be used partly or entirely in order to adjust the balance between free calcium and sequestered calcium. These acids are particularly useful where calcium salts of fatty acids are used as flotation aids in the deinking process.

5.4. Monocomponent Cellulase Treatment

The enzyme used in the method of the present invention is a monocomponent cellulase. The "monocomponent cellulase" as defined herein is an enzyme that hydrolyses cellulose and is essentially free of other cellulase components. Examples of specific cellulasea are disclosed in Dalbøge and Hansen, 1994, Mol. Gen. Gen. 243:253–260. In a specific embodiment, the monocomponent cellulase may, for example, be an endo-β-D-1,4-glucanase (1,4-β-D-glucan glucanohydrolase, EC 3.2.1.4) which catalyzes the cleavage of internal β-1,4-glucosidic linkages; cellobiohydrolase (1,4-β-D-glucan cellobiohydrolase, EC 3.2.1.91) which catalyzes the removal of glucose from non-reducing chain ends; 1,4-β-D-glucan glucohydrolase, EC 3.2.1.74, which catalyzes the removal of cellobiose from non-reducing chain-ends; or cellobiase (β-glucosidase, EC 3.2.1.21), which catalyzes the cleavage of cellobiose to glucose.

The monocomponent cellulase may be derived from microorganisms which are known to be capable of producing cellulolytic enzymes, e.g. species of *Humicola*, *Thermomyces*, *Bacillus*, *Trichoderma*, *Fusarium*, *Myceliophthora*, *Phanerochaete*, *Schizophyllum*, *Penicillium*, *Aspergillus*, and *Geotricum*. The fungus may be cultured using procedures known in the art (see, e.g., Bennett, J. W. and LaSure, L. (eds.), More Gene Manipulations in Fungi, Academic Press, Calif., 1991). The monocomponent cellulase may be recovered from the medium and separated from other enzyme compounds by centrifugation or filtration, precipitating the proteinaceous components of the supernatant or liltrate by means of a salt, e.g., ammonium sulphate, followed by purification by a variety of chromatographic procedures, e.g., ion exchange chromatography, gel filtration chromatography, affinity chromatography, or the like.

The isolated monocomponent cellulase is characterized by e.g., SDS-PAGE and assayed using procedures known in the art. In one embodiment, the cellulase, particularly an endo-β-D-1,4-glucanase may be assayed by determining the cellulolytic activity of the cellulase. Specifically, a cellulolytic enzyme, such as endo-β-D-1,4-glucanase hydrolyze carboxy-methylcellulose (CMC), thereby increasing the viscosity of the incubation mixture. The resulting reduction in viscosity may be determined by a vibration viscosimeter (e.g. MIVI 3000 from Sofraser, France). The cellulolytic activity of the enzyme may be quantified by means of an ECU assay. The ECU assay quantifies the amount of catalytic activity present in the sample by measuring the ability of the sample to reduce the viscosity of a solution of carboxy-methylcellulose (CMC).

Alternatively, the cellulase may be assayed for activity on amorphous cellulose. Examples of cellulases which have such activity are endo-β-D-1,4-glucanase and cellobiohydrolase. However, cellobiohydrolase has no activity on CMC.

Furthermore, cellulase activity on cellotriose may also be determined. Specifically, the cellulase activity on cellotriose, in terms of $k_{cat}.s^{-1}$, is determined by a coupled assay:

Cellotriose→Glucose+Cellobiose (cat.:cellulase)

Glucose+$O_2$+$H_2O$ →Gluconase+$H_2O_2$ (cat.:glucoseoxidase)

$H_2O_2$+$ABTS^R$→$ABTS^{ox}$ (cat.:peroxidase)

which is followed spectrophotometrically at 418 nm (maximum absorbance of $ABTS^{ox}$ at 418 nm. $ABTS^R$ is 2,2'-Azino-di-[3-ethylbenzthiazoline sulfonate (6)] and may be obtained commercially from Boerhinger Mannheim. The $k_{cat}.s^{-1}$ is calculated from a Lineweaver-Burk plot. The following constants are used from the calculations:

cellulase: $\epsilon=66$, $310M^{-1}.cm^{-1}$ and ABTS: $\epsilon=0.0323$ $\mu mole^{-1}.cm^{-1}$.

Alternatively, the monocomponent cellulase may be obtained using recombinant DNA procedures. The nucleic acid sequences encoding the monocomponent cellulase may be of genomic or cDNA origin and may, for instance, be obtained by preparing a genomic or cDNA library of an appropriate organism, and screening for nucleic acid sequences coding for all or part of the monocomponent cellulase by hybridization using synthetic oligonucleotide probes, e.g. prepared on the basis of the amino acid sequence of the monocomponent cellulase, in accordance with standard techniques (cf. Sambrook et al., Molecular Cloning: A Laboratory Manual, 2nd Ed., Cold Spring Harbor, 1989).

The nucleic acid sequences may also be prepared synthetically by established standard methods, e.g., the phosphoamidite method described by S. L. Beaucage et al. (1981), Tetrahedron Letters 22, pp. 1859–1869 and Matthes et al. (1984), The EMBO J. 3:801–805. According to the phosphoamidite method, oligonucleotides are synthesized, e.g., in an automatic DNA synthesizer, purified, ligated, and cloned in an appropriate vector.

Finally, the nucleic acid sequences may be of mixed synthetic and genomic, mixed synthetic and cDNA or mixed genomic and cDNA origin prepared by ligating fragments of synthetic, genomic or cDNA origin (as appropriate), the fragments corresponding to various parts of the entire DNA construct, in accordance with standard techniques.

The cell used for the expression of the monocomponent cellulase in the processes of the invention is suitably a cell which, on cultivation, produces large amounts of the monocomponent cellulase of the invention. As stated above, the cell may be one which in nature produces the monocomponent cellulase of the invention, but is preferably a cell of the invention which has been transformed with a nucleic acid sequence encoding the monocomponent cellulase. The cell may conveniently be one which has previously been used as a host for producing recombinant proteins, either a prokaryotic or eukaryotic cell, including but not limited to mammalian cells, insect cells, plant cells or fungal cells and is preferably a microorganism such as a bacterium or a fungus. The term "fungus" is intended to comprise filamentous fungi as well as yeasts.

Examples of suitable bacteria are gram positive bacteria of the genus *Bacillus* such as *Bacillus subtilis, Bacillus licheniformis, Bacillus lentus, Bacillus brevis, Bacillus stearothermophilus, Bacillus alkalophilus, Bacillus amyloliquefaciens, Bacillus coagulans, Bacillus megaterium, Bacillus circulans, Bacillus lautus* and of the genus *Streptomyces* such as *Streptomyces lividans*. Examples of suitable gram-negative bacteria comprises bacteria of the genus *Escherichia* such as E. coli. The transformation of the bacterial host cell may for instance be effected by protoplast transformation or by using competent cells in a manner known per se. Another suitable bacterial cell is a cell of a *Pseudomonas* spp. such as *Pseudomonas cepacia, Pseudomonas fragi, Pseudomonas gladioli, Pseudomonas fluorescens, Pseudomonas stutzeri, Pseudomonas alcaligenes, Pseudomonas pseudoalcaligenes, Pseudomonas putida, Pseudomonas glumae or Pseudomonas aeruginosa*.

Alternatively, the cell may be a fungus, i.e. a cell of a yeast or of a filamentous fungus. The yeast cell may, for instance, be a cell of the genus *Saccharomyces* such as *S. cerevisiae*. The filamentous fungus host organism may, for instance, be a strain of *Aspergillus sp.*, such as *A. niger, A. nidulans or A. oryzae*. The techniques used to transform an *Aspergillus* host cell and obtain expression of the recombinant protein may suitably be as described in EP 238 023. Alternatively, the fungal host cell may be a strain of a *Fusarium sp.* such as *F. oxysporum*, the transformation of which, e.g., may be carried out as described by Malardier et al., 1989, Gene 78:147–156.

In order to obtain expression, the nucleic acid sequence encoding the monocomponent cellulase is normally preceded by a promoter. The promoter may be any nucleic acid sequence exhibiting a strong transcriptional activity in the host cell of choice and may be derived from a gene encoding an extracellular or intracellular protein such as an amylase, a glucoamylase, a protease, a lipase, a cellulase or a glycolytic enzyme. Examples of suitable promoters, especially when using a bacterial host, are the promoter of the lac operon of E. coli, the *Streptomyces coelicolor agarase* gene dagA promoters, the promoters of the *Bacillus licheniformis* α, the promoters of the *Bacillus licheniformis* α-amylase gene (amyL), the promoters of the *Bacillus stearothermophilus* maltogenic amylase gene (amyM), the promoters of the *Bacillus amyloliquefaciens* α-amylase (amyQ), or the promoters of the *Bacillus subtilis* xylA and xinB genes. In a yeast host, a useful promoter is the eno-1 promoter. For transcription in a fungal host, examples of useful promoters are those derived from the gene encoding A. oryzae TAKA amylase, *Rhizomucor miehei* aspartic proteinase, *A. niger* neutral α-amylase, A. niger acid stable α-amylase, *A. niger* or *A. awamsii* glucoamylase (gluA), *Rhizomucor miehei* lipase, *A. oryzae* alkaline protease, *A. oryzae* triose phosphate isomerase or *A. nidulans* acetamidase. Preferred are the TAKA-amylase and gluA promoters.

Other sequences involved in expression of the monocomponent cellulase include termination and polyadenylation sequences as well as ribosome binding sites and may suitably be derived from the same sources as the promoter. The vector may further comprise a nucleic acid sequence enabling the vector to replicate in the host cell in question, e.g., a suitable origin of replication.

The vector may also comprise a selectable marker, e.g., a gene the product of which complements a defect in the host cell, such as the dal genes from *B.subtilis* or *B.licheniformis*, or one which confers antibiotic resistance such as ampicillin, kanamycin, chloramphenicol or tetracycline resistance. Examples of *Aspergillus* selection markers include amdS, pyrG, argB, niaD and sC, a marker giving rise to hygromycin resistance. Preferred for use in an *Aspergillus* host cell are the amdS and pyrG markers of *A. nidulans* or *A. oryzae*. A frequently used mammalian marker is the dihydrofolate reductase (DHFR) gene. Furthermore, selection may be accomplished by co-transformation, e.g., as described in WO 91/17243.

The procedures used to ligate the DNA construct comprising the nucleic acid sequence encoding the monocomponent cellulase the promoter, terminator and other elements, respectively, and to insert them into suitable vectors containing the information necessary for replication, are well known to persons skilled in the art (cf., for instance, Sambrook et al., Molecular Cloning, Cold Spring Harbor, N.Y., 1989).

A cell either comprising a DNA construct or an expression vector of the invention as defined above is advantageously used as a host cell in the recombinant production of the monocomponent cellulase. The host cell may be transformed with the DNA construct, conveniently by integrating the DNA construct in the host chromosome to obtain a recombinant host cell. This integration is generally considered to be an advantage as the DNA sequence is more likely to be stably maintained in the cell. Integration of the DNA constructs into the host chromosome may be performed according to conventional methods, e.g., by homologous or heterologous recombination. Alternatively, the cell may be transformed with an expression vector as described above in connection with the different types of host cells.

The broth or medium used in the processes of the invention for fermentation of the resulting recombinant host cell may be any conventional medium suitable for growing the cell in question. Suitable media, e.g. minimal or complex media, are available from commercial suppliers or may be prepared according to published recipes (e.g. in catalogs of the American Type Culture Collection).

The monocomponent cellulase may be recovered from the broth by conventional procedures including but not limited to separating the cells from the broth by centrifugation or filtration, if necessary, after disruption of the cells, precipitating the proteinaceous components of the supernatant or filtrate by means of a salt, e.g., ammonium sulphate, followed by purification by a variety of chromatographic procedures, e.g., ion exchange chromatography, affinity chromatography, or the like, the actual recovery method being dependant on the kind of enzyme in question.

In a specific embodiment, the monocomponent cellulase is a cellulase which exhibits cellulase activity on amorphous cellulose, e.g., an endo-$\beta$-D-1,4-glucanase. In a preferred embodiment, the monocomponent cellulase catalyzes the hydrolysis of cellotriose, e.g., endo-$\beta$-D-1,4-glucanase. In a specific embodiment, the endo-$\beta$-D-1,4-glucanase may be derived from *Humicola insolens*, e.g. *Humicola insolens* strain DSM 1800 (deposited with the Deustche Sammlung von Mikroorganismen, Mascheroder Weg 1B, D-3300 on Oct. 1, 1981 in accordance with the provisions of the Budapest Treaty). The endo-$\beta$-D-1,4-glucanase may possess a separate cellulose binding domain and is therefore able to cause hydrolysis of the cellulose chains in the crystalline regions of the cellulose substrate, e.g., Endoglucanase V. Endoglucanase V has been isolated from *H. insolens* and has a molecular weight of about 43 kDa and a pI of about 5.2. Alternatively, the endo-$\beta$-D-1,4-glucanase may not possess a separate cellulose binding domain and thus operates in the amorphous regions of the cellulosic substrate, e.g. Endoglucanase I. Endoglucanase I has a molecular weight of about 50 kDa and a pI of about 5.5. It has been isolated from *H. insolens* and has been cloned and expressed in *Aspergillus*, incorporated herein by reference.

The dosage of cellulase added ranges from about 0.02–1.0% (w/w) on oven-dried printed paper. The duration of enzyme treatment is from about 5 minutes to about 120 minutes at about 35° C. to about 75° C.

5.5. Separation of Inks, coatings, and toners From the Pulp Slurry

After the enzyme treatment, the ink particles have been released from the pulp slurry. The ink may then be separated from the pulp by methods known in the art, such as mechanical deinking, e.g., flotation; chemi-mechanical deinking; and agglomeration chemistry (see, for example, McBride, 1994, Pulp and Paper April, 1994, Miller Freeman Publishers, San Francisco, Calif., p. 44). The accepted pulp may then be washed.

After ink and coating separation, the deinked pulp is suitable for papermaking by conventional methods.

6. EXAMPLES

6.1. EXAMPLE 1

6.1.1. Materials and Methods 110 air-dried (a.d.) g of 1 inch squares of photocopied/ laser printed white paper was added to a British paper disintegrator (supplied by Testing Machines Inc., Amityville, N.Y.) in pre-warmed, deionized water (40° C.) in increments so that a 5% consistency was achieved. The pH at this point was 9.2. After the preliminary disintegration, the pH was adjusted downwards to 7.5 with 4N sulfuric acid. The desired amount of enzyme, either Novozym®342, a multicomponent cellulose (Novo Nordisk A/S; derived from *Humicola insolens* and described in U.S. Pat. No. 4,435,307, specific activity 675 ECU/g), Endoglucanase I (specific activity 2,500 ECU/g) or Endoglucanase V (specific activity 7500 ECU/g) diluted into a buffer solution (0.05M sodium phosphate, pH 7.0) was added and the disintegration was continued for another 20 minutes. Endoglucanase I and Endoglucanase V are also derived from *Humicola insolens*.

The treated disintegrated pulp was added to approximately 14 L of tap water at 50° C. in the Lamort deinking cell (Lamort SA, Vitry-le-Francois, France). The pulp mixture was stirred for 30 min. to remove any entrained air present from the disintegration step. A 1 L pulp sample was collected at this point for a feed pulp brightness data point. The deinking cell was then started, and run at a rotor speed of 1100 rpm for 10 min. There was a constant manual removal of the ink particles that floated to the top during this 10 min. period. These rejects were collected, filtered, dried, and weighed.

The accepts remaining behind in the cell were drained and brightness pads were made from a part of the pulp. Four liters of the accepted pulp was passed through a Tyler standard 80 mesh screen in one liter increments to stimulate pulp washing. The pulp from this procedure was collected and suspended in 2.5 liters of deionized water and brightness pads were made from the washed pulp. The rejects, or the material passing through the screen, were filtered, dried, and weighed.

Brightness pads were formed on a 15 cm filter paper in a Buchner filter lined with 200 mesh plastic screen. The minimum pad weight was 3 grams. The moist pads were pressed between blotting papers, and placed in Tappi restraining rings, while drying to atmospheric moisture levels. The brightness values were obtained using a Photovolt Model 577 brightness meter (Photovolt Corp., Indianapolis, Ind. 46225) by taking six individual readings on both top and bottom of the pulp pad. These values were averaged; the final pad brightness used was the average of the top and bottom readings.

6.1.2. Results

Figure 1:
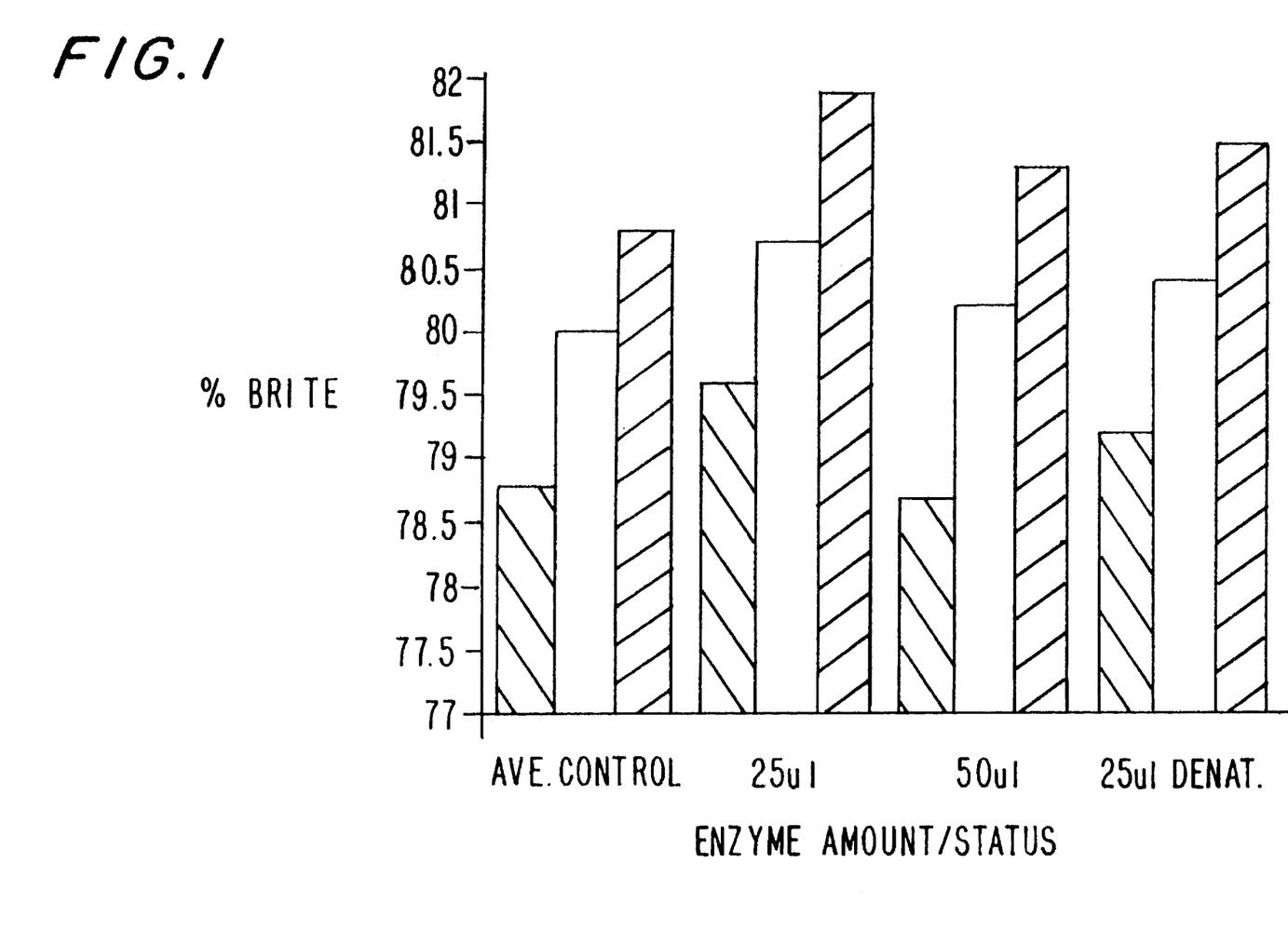
FIG. 1 shows deinking of printed photocopy/laser printer paper after treatment with Novozym®342, a multicomponent cellulase form Novo Nordisk A/S.
Figure 2:
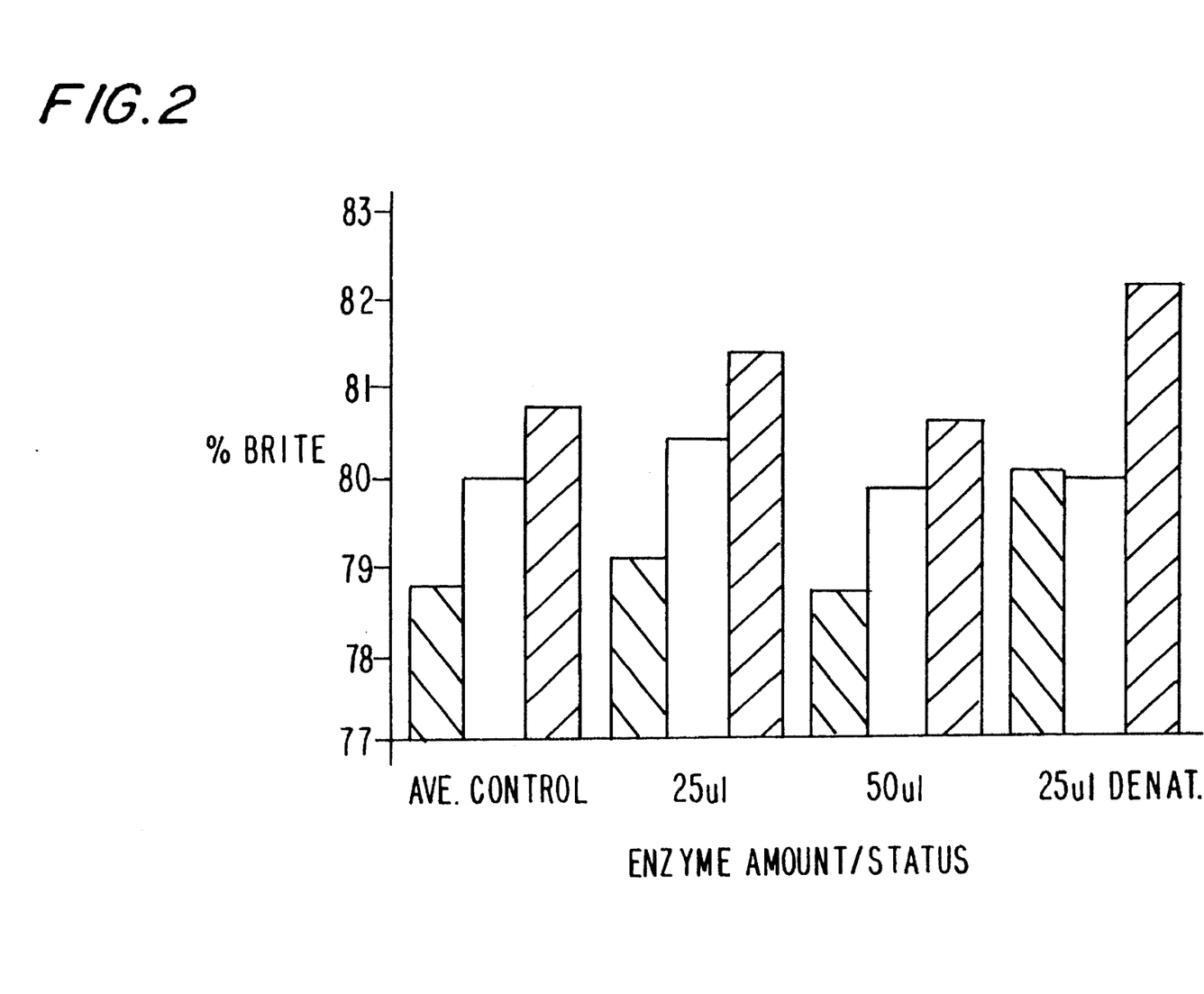
FIG. 2 shows deinking of printed photocopy/laser printer paper after treatment with *Humicola insolens* Endoglucanase V.
Figure 3:
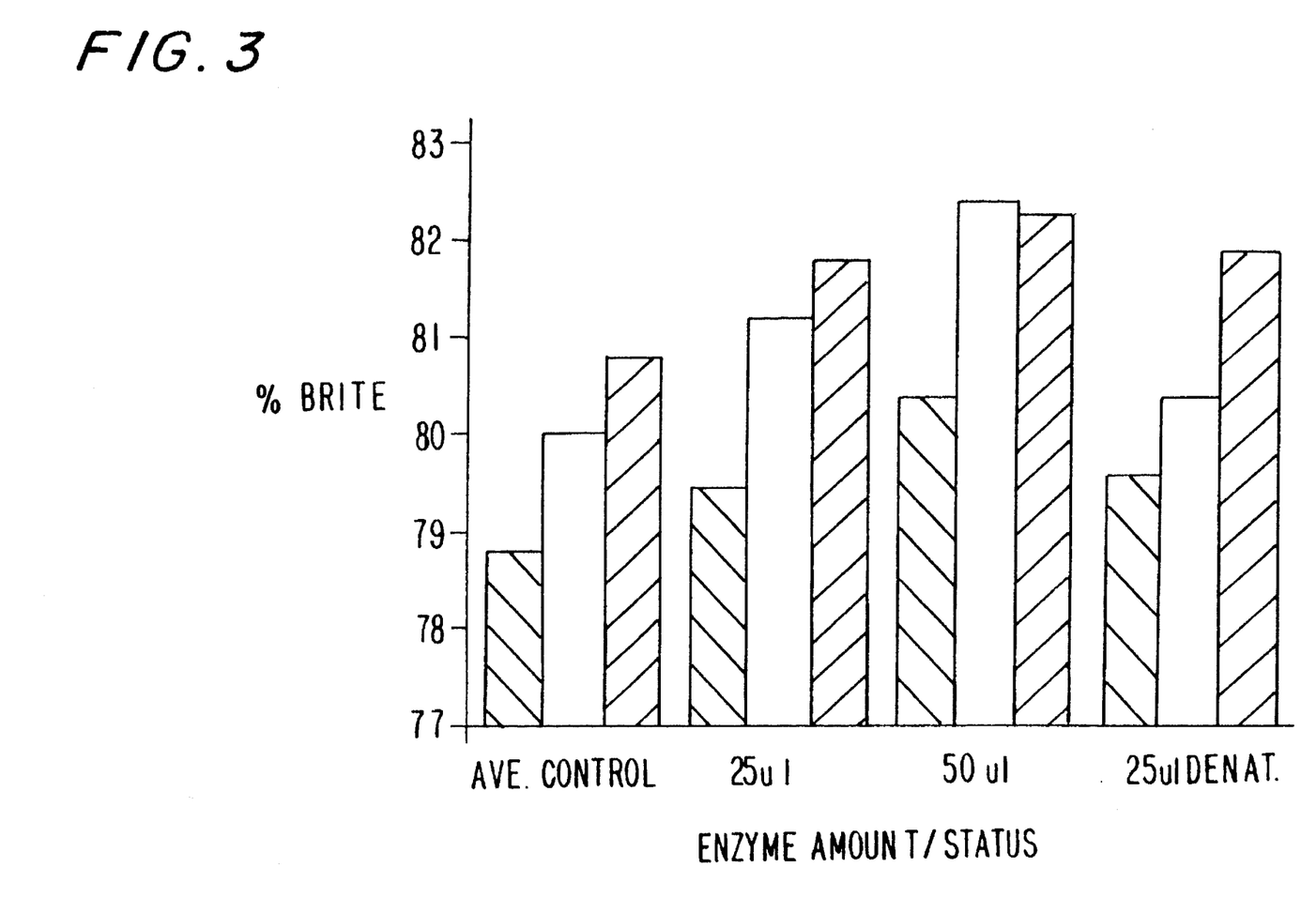
FIG. 3 shows deinking of printed photocopy/laser printer paper after treatment with *Humicola insolens* Endoglucanase I.

The results obtained using Novozym®342 are shown in FIG. 1. Each sample point contains three data points representing sampled collected from the deinking cell feed, after the flotation step, and after washing the flotation accepts. In FIGS. 1, 2, and 3, these sample points are shown by black, white and gray bars, respectively. The brightness gain reached a maximum at an addition rate of 25 ul/100 o.d. g of waste.

The results obtained using Endoglucanase V are shown in FIG. 2. The general shape of the response curve through the control, 25, and 50 ul dosages appears to be similar to Novozym®342. The increase in the feed brightness value seen for Novozym®342 was not observed in this case.

The results obtained using Endoglucanase I are shown in FIG. 3. There was not a dosage:performance optimum at the low dosage levels as seen for Novozym®342 and Endoglucanase V. Over the dosage range examined, the brightness continued to improve. The feed brightness levels increased with increasing dosage. The presence of larger ink particles is amplified by the larger brightness gain seen across the flotation cell versus the smaller gain observed through washing.

The results show that a much better deinking can be obtained using Endoglucanase I instead of the multicomponent Enzyme Novozym®342.

6.2. EXAMPLE 2

6.2.1. Materials and Methods

Endoglucanase I from *H. insolens* DSM 1800 was tested on non-contact printed wood-free paper in a simple experiment, that first involved pulping the waste in deionized water at 5% consistency, 45° C. for 30 min. at a pH initially of 7.5. The pulp was diluted in the deinking cell to about 2% consistency, and the requisite amount of Endoglucanase I in the 0.05M phosphate buffer, pH 7.5 was added; it was stirred for an additional 30 minutes at 50° C. A deinking cell was filled and a 10 minute flotation cycle was run. During the 40 minutes, the pH of the pulp climbed to pH 8–8.2. Afterwards, as in the previous example, the accepted pulp was washed. A feed stock sample was removed before the flotation stage began. A sample was taken at the end of the flotation stage.

Brightness pads were made as described in Example 1. The washed pulp was also subjected to image analysis for ink count values. Each ink count determination was performed in the same way.

6.2.2. Results

Figure 4:
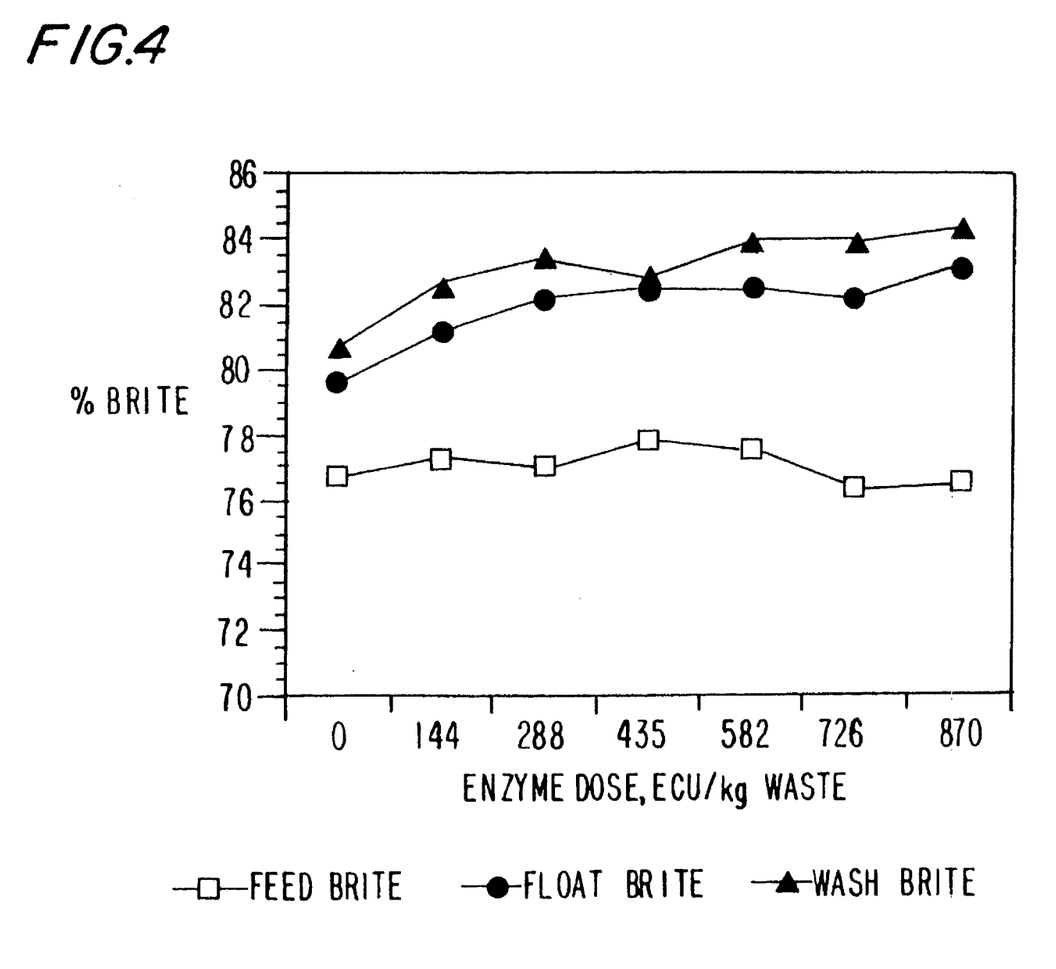
FIG. 4 shows brightness results from low consistency toner removal with *Humicola insolens* Endoglucanase I.
Figure 5:
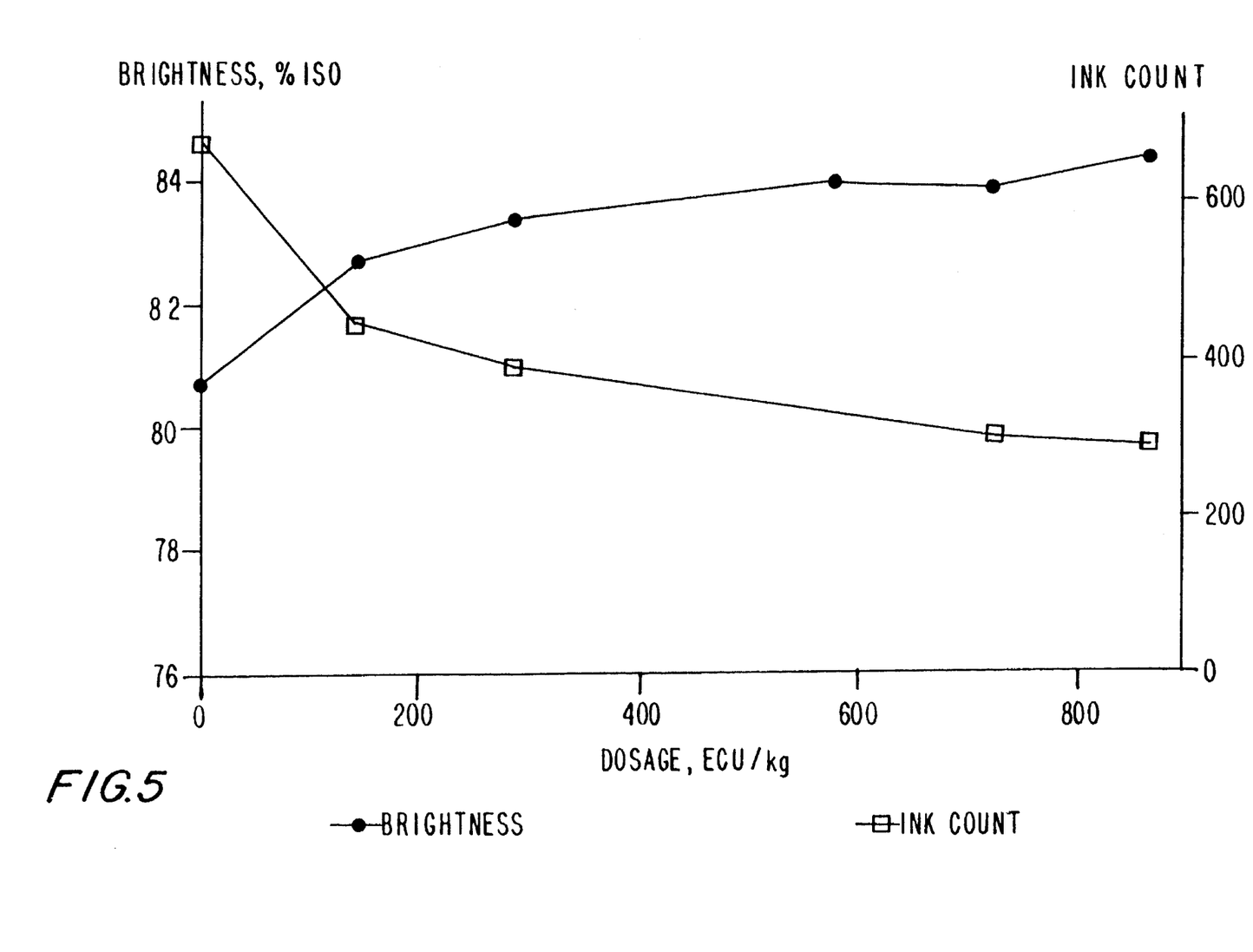
FIG. 5 shows brightness and dirt count results with *Humicola insolens* Endoglucanase I.

The results shown for Endoglucanase I are shown in FIGS. 4 and 5. Endoglucanase I demonstrated a response curve without an optimum. The brightness of the washed pulp continues to increase as the enzyme dosage is increased. The response levels off after about 300 ECU/kg waste. The results in FIG. 5 indicate that brightness values are inversely proportional to ink content.

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

Various references are cited herein, the disclosures of which are incorporated by reference in their entireties.

What is claimed is:

1. A method for removing inks, coatings, and toners from printed paper comprising the steps of
   (a) pulping said printed paper at a consistency above about 3% to obtain a pulp slurry;
   (b) treating the pulp slurry with at least one monocomponent cellulase in an amount effective to release inks, coatings, and toners from said pulp slurry; and
   (c) separating the released inks, coatings, and toners from the pulp slurry.

2. The method according to claim 1 in which the consistency in step (a) is from about 3.5% to about 40%.

3. The method according to claim 1 in which the consistency in step (a) is from about 10% to about 20%.

4. The method according to claim 1 in which the pH of the pulp slurry of step (a) is above about 6.5.

5. The method according to claim 1 in which the pH of the pulp slurry of step (a) is above about 8.5.

6. The method according to claim 5 which further comprises before step (b) lowering the pH of the pulp slurry of step (a) between about 6.5 and about 8.5 by the addition of an acidifying agent.

7. The method according to claim 1 in which said printed paper is pulped in step (a) for about two minutes to about 10 minutes.

8. The method according to claim 7 which further comprises during the treatment of said pulp slurry of step (b), further pulping said pulp slurry for at least about 20 minutes.

9. The method according to claim 1 in which said printed paper is pulped in step (a) for at least about 20 minutes.

10. The method according to claim 1 which further comprises after step (a) diluting the pulp slurry at least about two fold.

11. The method according to claim 10 in which the pulp slurry is diluted before step (b).

12. The method according to claim 10 in which the pulp slurry is diluted after step (b).

13. The method according to claim 1 in which the monocomponent cellulase is endo-β-D-1,4-glucanase.

14. The method according to claim 13 in which the endo-β-D-1,4-glucanase is capable of catalyzing the hydrolysis of cellotriose.

15. The method according to claim 13 in which the endo-β-D-1,4-glucanase is derived from *Humicola insolens*.

16. The method according to claim 15 in which the endo-β-D-1,4-glucanase is Endoglucanase I.

17. The method according to claim 15 in which the endo-β-D-1,4-glucanase is Endoglucanase V.

18. The method according to claim 1 in which the monocomponent cellulase is a cellobiohydrolase.

19. The method according to claim 1 in which the pulp slurry is treated with the monocomponent cellulase in step (b) for at least about five minutes.

20. The method according to claim 1 in which the pulp slurry is treated with the monocomponent cellulase in step (b) at a temperature of about 30° C. to about 75° C.

21. The method according to claim 1 in which the released inks, coatings, and toners are separated from the pulp slurry by flotation.

22. The method according to claim 21 in which after flotation said pulp slurry is washed.

23. The method according to claim 1 which comprises treating the pulp slurry of step (a) with more than one monocomponent cellulase.

24. The method according to claim 1 which further comprises treating the pulp slurry of step (a) with a multicomponent cellulase.

25. A method for removing inks, coatings, and toners from printed paper comprising the steps of
   (a) adding at least one monocomponent cellulase in an amount effective to release inks, coatings, and toners from printed paper suspended in water to said suspended printed paper;
   (b) simultaneously treating the suspended printed paper of step (a) with said monocomponent cellulase and pulping said printed paper at a consistency above about 3% to obtain a pulp slurry; and
   (c) separating the released inks, coatings, and toners from the pulp slurry.

\* \* \* \* \*